US008107388B2

(12) United States Patent
Blum et al.

(10) Patent No.: US 8,107,388 B2
(45) Date of Patent: Jan. 31, 2012

(54) ROUTE TRACING PROGRAM CONFIGURED TO DETECT PARTICULAR NETWORK ELEMENT MAKING TYPE OF SERVICE MODIFICATION

(75) Inventors: Paul Blum, Highlands Ranch, CO (US); Jean Meloche, Madison, NJ (US); Kenneth Pearl, Braintree, MA (US); Anton Rager, Larkspur, CO (US); Balaji Sathyanarayana Rao, Somerville, NJ (US); John R. Tuck, Jr., Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 229 days.

(21) Appl. No.: 12/108,949

(22) Filed: Apr. 24, 2008

(65) Prior Publication Data
US 2009/0268622 A1 Oct. 29, 2009

(51) Int. Cl.
*H04L 12/26* (2006.01)
(52) U.S. Cl. ........................................................ 370/252
(58) Field of Classification Search ........................ None
See application file for complete search history.

(56) References Cited

U.S. PATENT DOCUMENTS

| | | | | |
|---|---|---|---|---|
| 5,675,741 A * | 10/1997 | Aggarwal et al. | ............. | 709/242 |
| 6,104,695 A * | 8/2000 | Wesley et al. | ................. | 370/216 |
| 6,970,429 B2 * | 11/2005 | Arsikere et al. | ............. | 370/244 |
| 7,031,264 B2 | 4/2006 | Adhikari et al. | | |
| 7,313,098 B2 | 12/2007 | Bearden et al. | | |
| 7,327,721 B2 | 2/2008 | Balasaygun et al. | | |
| 7,584,294 B2 * | 9/2009 | Plamondon | ................... | 709/233 |
| 2003/0086425 A1 | 5/2003 | Bearden et al. | | |
| 2003/0091165 A1 | 5/2003 | Bearden et al. | | |
| 2003/0097438 A1 | 5/2003 | Bearden et al. | | |
| 2004/0252694 A1 | 12/2004 | Adhikari et al. | | |
| 2005/0053009 A1 | 3/2005 | Denby et al. | | |
| 2005/0207410 A1 | 9/2005 | Adhikari et al. | | |
| 2006/0126528 A1 * | 6/2006 | Ramalho | ....................... | 370/252 |
| 2007/0171836 A1 * | 7/2007 | Yoshimi et al. | ............... | 370/250 |
| 2008/0025223 A1 | 1/2008 | Karacali-Akyamac et al. | | |
| 2008/0069334 A1 | 3/2008 | Denby et al. | | |
| 2008/0080376 A1 | 4/2008 | Adhikari et al. | | |

OTHER PUBLICATIONS

SGI TPL View (traceroute), http://techpubs.sgi.com/library/tpl/, pp. 1-5.
DragonFly On-Line Manual Pages, http://leaf.dragonflybsd.org/, pp. 1-6.
U.S. Appl. No. 11/678,940 filed in the name of L. Denby et al. on Feb. 26, 2007 and entitled "Detection of Asymmetric Network Routes."

* cited by examiner

*Primary Examiner* — Kevin C Harper
*Assistant Examiner* — Rhonda Murphy (57) ABSTRACT

One or more network elements that modify type of service values in a network are detected by sending route tracing messages having increasing time-to-live values and a designated type of service value from a first network element to a second network element. Type of service values are monitored in respective time exceeded messages received from respective network elements on a given network path between the first network element and the second network element responsive to the route tracing messages. At least a particular one of the network elements on the given network path that has made a modification in type of service value relative to the designated type of service value is identified, based on the monitored type of service values in the respective time exceeded messages.

20 Claims, 4 Drawing Sheets

| TTL | IP | DS | Source | type/code |
|---|---|---|---|---|
| 1 | ip3 | 46 | ip2:5000 | Time exceeded/TTL equals 0 during transit |
| 2 | ip4 | 46 | ip2:5000 | Time exceeded/TTL equals 0 during transit |
| 3 | ip5 | 46 | ip2:5000 | Time exceeded/TTL equals 0 during transit |
| 4 | ip6 | 46 | ip2:5000 | Time exceeded/TTL equals 0 during transit |
| 5 | ip7 | 46 | ip2:5000 | Time exceeded/TTL equals 0 during transit |
| 6 | ip8 | 46 | ip2:5000 | Time exceeded/TTL equals 0 during transit |
| 7 | ip9 | 46 | ip2:5000 | Time exceeded/TTL equals 0 during transit |
| 8 | ip10 | 46 | ip2:5000 | Time exceeded/TTL equals 0 during transit |
| 9 | ip11 | 46 | ip2:5000 | Time exceeded/TTL equals 0 during transit |
| 10 | ip12 | 46 | ip2:5000 | Time exceeded/TTL equals 0 during transit |
| 11 | ip1 | 46 | ip2:5000 | Destination unreachable/Port unreachable error |

FIG. 2B

| TTL | IP | DS | Source | type/code |
|---|---|---|---|---|
| 1 | ip3 | 34 | ip2:5000 | Time exceeded/TTL equals 0 during transit |
| 2 | ip4 | 34 | ip2:5000 | Time exceeded/TTL equals 0 during transit |
| 3 | ip5 | 34 | ip2:5000 | Time exceeded/TTL equals 0 during transit |
| 4 | ip13 | 34 | ip2:5000 | Time exceeded/TTL equals 0 during transit |
| 5 | ip7 | 34 | ip2:5000 | Time exceeded/TTL equals 0 during transit |
| 6 | ip8 | 18 | ip2:5000 | Time exceeded/TTL equals 0 during transit |
| 7 | ip9 | 18 | ip2:5000 | Time exceeded/TTL equals 0 during transit |
| 8 | ip10 | 18 | ip2:5000 | Time exceeded/TTL equals 0 during transit |
| 9 | ip14 | 18 | ip2:5000 | Time exceeded/TTL equals 0 during transit |
| 10 | ip12 | 18 | ip2:5000 | Time exceeded/TTL equals 0 during transit |
| 11 | ip1 | 18 | ip2:5000 | Destination unreachable/Port unreachable error |

FIG. 2C

| TTL | IP | DS | Source | type/code |
|---|---|---|---|---|
| 1 | ip3 | 0 | ip2:5000 | Time exceeded/TTL equals 0 during transit |
| 2 | ip4 | 0 | ip2:5000 | Time exceeded/TTL equals 0 during transit |
| 3 | ip5 | 0 | ip2:5000 | Time exceeded/TTL equals 0 during transit |
| 4 | ip13 | 0 | ip2:5000 | Time exceeded/TTL equals 0 during transit |
| 5 | ip7 | 0 | ip2:5000 | Time exceeded/TTL equals 0 during transit |
| 6 | ip8 | 18 | ip2:5000 | Time exceeded/TTL equals 0 during transit |
| 7 | ip16 | 20 | ip2:5000 | Time exceeded/TTL equals 0 during transit |
| 8 | ip17 | 18 | ip2:5000 | Time exceeded/TTL equals 0 during transit |
| 9 | ip18 | 20 | ip2:5000 | Time exceeded/TTL equals 0 during transit |
| 10 | ip19 | 18 | ip2:5000 | Time exceeded/TTL equals 0 during transit |
| 11 | ip20 | 20 | ip2:5000 | Time exceeded/TTL equals 0 during transit |
| 12 | ip15 | 18 | ip2:5000 | Destination unreachable/Port unreachable error |

FIG. 2D

DiffServ 1 at IP ip3 Destination unreachable/Communication Administratively Prohibited
DiffServ 0-63 preserved end-to-end remarking report paths report
p0: ip3 ip4 ip5 ip22 ip23 ip21
p1: 0.0.0.0
p2: ip3 ip4 ip5 ip24 ip23 ip21 p0 for DiffServs: 0, 3, 6-8, 11, 14-16, 19, 22-24, 27, 30-32, 35, 38-40, 43, 46-48, 51, 54-56, 59, 62-63
p1 for DiffServs: 1
p2 for DiffServs: 2, 4-5, 9-10, 12-13, 17-18, 20-21, 25-26, 28-29, 33-34, 36-37, 41-42, 44-45, 49-50, 52-53, 57-58, 60-61

ROUTE TRACING PROGRAM CONFIGURED TO DETECT PARTICULAR NETWORK ELEMENT MAKING TYPE OF SERVICE MODIFICATION

FIELD OF THE INVENTION

The invention relates generally to communication networks, and more particularly to network monitoring and analysis techniques.

BACKGROUND OF THE INVENTION

Network monitoring and analysis systems are commonly utilized to ensure that networks are meeting particular Quality of Service (QoS) requirements, such as those associated with Internet Protocol (IP) telephony, also referred to as Voice over IP (VoIP). Such systems typically collect low-level network measurements, such as delay, jitter and packet loss. See, for example, U.S. Patent Application Publication No. 2005/0053009, entitled "Method and Apparatus for Automatic Determination of Performance Problem Locations in a Network," which is commonly assigned herewith and incorporated by reference herein.

VoIP communications generally do not tolerate delay, jitter and packet loss well. Accordingly, the packets that make up such communications are usually given priority over the packets of other applications in the routing decisions made by routers and other network elements. This is typically achieved by marking the packets with a particular type of service (TOS) value. For example, a given byte of the TOS field in the IP header of a given VoIP packet may be marked at its source network element with a particular Differentiated Services Code Point (DSCP) value that is indicative of a VoIP packet. This may be, for example, a value of 46, or another designated value. All of the routers or other network elements involved in forwarding such packets are configured to expedite the delivery of packets that are marked in that way.

A significant problem arises when the routers or other network elements involved in forwarding VoIP packets inappropriately remark the TOS field of the IP header. Such remarking can interfere with IP telephony. To address this issue, network engineers often use so-called "sniffers" at source and destination network elements in order to determine whether the TOS field in the IP header of a given VoIP packet was changed during the trip from the source element to the destination element. Such sniffers may be able to detect that a change has been made in the TOS field somewhere within a given network path, but are unable to indicate the particular network element or elements that made the change. Also, if a remarked TOS value is subsequently returned to its original value by another network element on the path, the TOS value will appear based on the sniffers at the source and destination elements as if it was preserved end-to-end. Thus, it is possible that the sniffers will indicate no change in TOS value even though the TOS value may have been changed by several different network elements. The deficiencies of the sniffer approach are made worse by the fact that network paths can be very long and span a very large geographic area. Thus, the engineer is unable to easily locate the particular network element or elements that are performing the TOS remarking.

Similar deficiencies are present in those versions of conventional "traceroute" programs that provide an indication that a destination network element is unreachable for a particular TOS value. In this situation, the conventional traceroute program will generally give up and exit, again failing to provide any indication regarding the particular network element or elements that performed TOS remarking.

SUMMARY OF THE INVENTION

The present invention in one or more illustrative embodiments provides an improved route tracing program that detects particular routers or other network elements that perform TOS remarking.

In accordance with an aspect of the invention, one or more network elements that modify TOS values in a network are detected by sending route tracing messages having increasing time-to-live values and a designated TOS value from a first network element to a second network element. TOS values are monitored in respective time exceeded messages received from respective network elements on a given network path between the first network element and the second network element responsive to the route tracing messages. At least a particular one of the network elements on the given network path that has made a modification in type of service value relative to the designated type of service value is identified, based on the monitored type of service values in the respective time exceeded messages. A visual display indicating the identified network element(s) in a visually-perceptible format may be generated.

In an illustrative embodiment, the designated TOS value comprises a particular Differentiated Services Code Point (DSCP) value. Numerous other types of TOS values may be used in implementing the invention.

The TOS remarking detection process in an illustrative embodiment may be repeated for each of a number of different network paths. The TOS remarking detection process may also or alternatively be repeated for each of a number of different designated TOS values. For example, the process may be repeated for all DSCP values between 0 and 63, and a remarking report may be generated that identifies which of the DSCP values are preserved end-to-end over certain network paths.

Any network elements identified as modifying the TOS value may be reconfigured by a network engineer so as to no longer modify the TOS value. Other alterations in network operation may be implemented based on the detection of TOS remarking. Also, an indicator of any network elements identified as modifying the TOS value may be transmitted to a network administrator.

In accordance with another aspect of the invention, a TOS remarking detection process may be implemented in a VoIP telephony communication manager element or other controller of the network. Such an embodiment may be configured to automatically execute the send, monitor and identify operations periodically for each of a number of different network paths and to report any associated anomalies, for example, to a ticketing system.

Advantageously, the present invention in the illustrative embodiments provides an improved approach to detection of TOS remarking in a network, which can be implemented from a single point in the network. This approach can be used, for example, to identify particular network elements that need to be reconfigured in order to prevent interference with IP telephony, or to ensure that desired types of remarking are being performed.

DETAILED DESCRIPTION OF THE INVENTION

The invention will be illustrated below in conjunction with exemplary processes for detecting TOS value modification, as well as associated communication networks and network processing elements. It should be understood, however, that the invention is not limited to use with any of these particular illustrative arrangements. For example, although particularly well-suited for use in VoIP applications, the disclosed techniques may be used with other types of data transmission, such as video streaming or transmission of signaling information. Those skilled in the art will recognize that the disclosed techniques may be used in any type of network application in which it is desirable to provide improved detection of TOS value modification.

Figure 1:
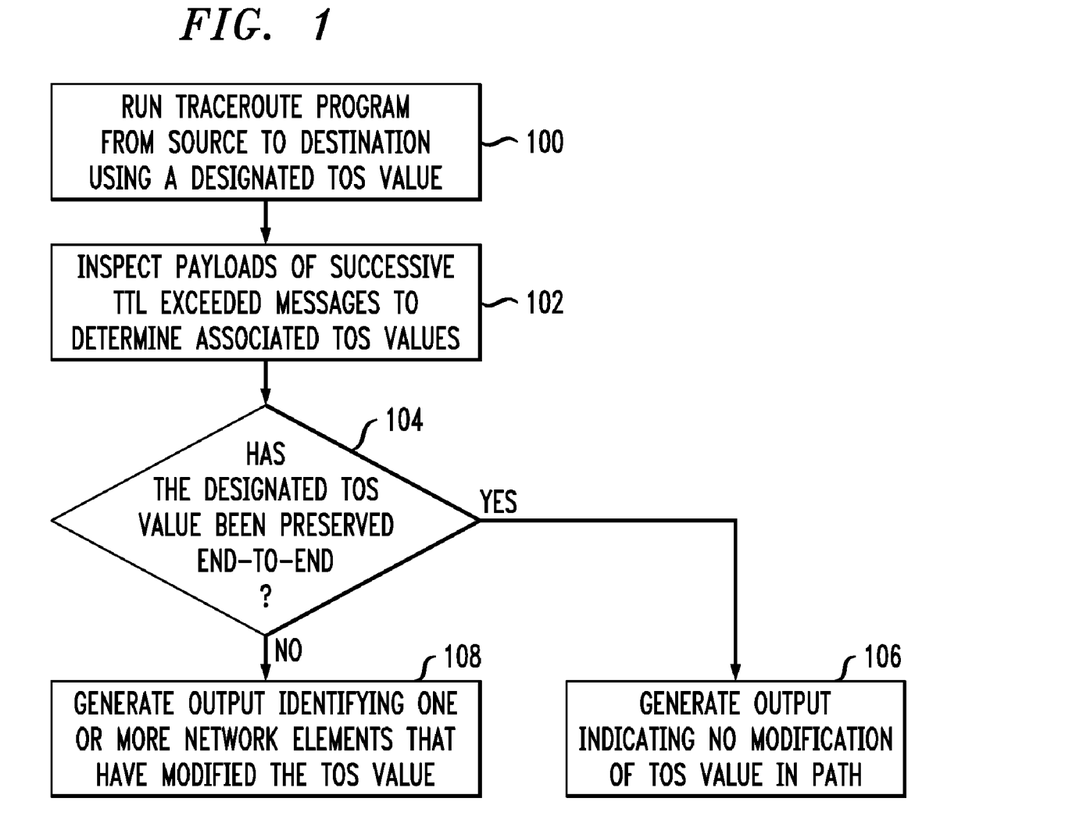
FIG. 1 is a flow diagram of an exemplary process for detecting TOS value modification in an illustrative embodiment of the invention.

Referring now to the flow diagram of FIG. 1, a process for detecting TOS value modification is shown. This process may be implemented in the form of one or more software programs that are executed by at least one processing element of a network. Such a processing element may comprise, for example, a network analysis device coupled to a router or other network element, or a portion of a router or other network element. Additional details regarding exemplary network element configurations will be described below in conjunction with FIGS. 3 and 4.

In step 100, a traceroute program, which may comprise an otherwise conventional traceroute utility modified as described herein, is run at a single point in a network to a desired destination point in the network. These points may be denoted as points A and B, also referred to as source and destination network elements, and may comprise, for example, routers, switches, gateways, endpoint devices or other types of network elements. The traceroute program traces routes between points A and B in a manner to be described below, and may be configured to produce certain performance data such as round-trip delay or loss in a conventional manner. A route is also referred to herein as a "network path."

The traceroute program traces the hops on a route from a source to a destination using the Time-To-Live (TTL) field of transmitted packets. In accordance with standard IP operation, each router receiving a packet will decrement the TTL field of that packet before forwarding it on to the next router. If a given router receives a packet with a TTL field having a value of one, and that router is not the destination of the packet, the given router discards the packet and sends an Internet Control Message Protocol (ICMP) TTL exceeded message back to the source. The traceroute program sends packets with monotonically increasing values in their respective TTL fields. For each TTL value, three packets are typically sent by default. This process generally continues until the packets sent with a given TTL value reach the destination and therefore do not trigger an ICMP TTL exceeded message.

The term "packet" as used herein is intended to encompass not only an IP packet but also other types of packets used in other packet-based communication networks. The techniques disclosed herein can be used with IP version 4 (IPv4) or IP version 6 (IPv6), or using other types of standard or non-standard communication protocols.

The packets of the traceroute program are examples of what are more generally referred to herein as "route tracing messages." In step 100, route tracing messages having increasing TTL values and a designated TOS value are sent from source to destination.

The designated TOS value may be any TOS value that is appropriate for the particular application at issue. The term "TOS value" as used herein is intended to be construed generally so as to encompass any value indicative of type of service, including, for example, DSCP values associated with Layer 3 routing, or class of service (COS) values associated with Layer 2 routing using an 802.1p protocol.

As indicated previously, a designated TOS value may be conveyed using at least a portion of a given byte of the TOS field in the IP header of a given packet. More specifically, this byte may be marked with a DSCP value that indicates that the packet is associated with a particular type of communication, such as 46 for VoIP packets. The DSCP value generally comprises the leftmost 6 bits of the TOS byte with the remaining two bits being unused. The DSCP values may range from 0 to 63 and the corresponding TOS values can be derived by multiplying by the TOS value by 4. Hence DSCP 46 corresponds to TOS 184 and DSCP 34 corresponds to 136. The values 46 and 34 are important to IP telephony because they are used for voice media and signaling respectively. It should be noted that DSCP value 34 is also used for video media which means that video media is in competition with voice signaling.

The traceroute program may be viewed as an example of what is more generally referred to herein as a route tracing program. It is to be appreciated that a wide variety of route tracing programs other than a suitably modified traceroute utility may be used in implementing the present invention. The term "route tracing program" as used herein is therefore intended to be construed broadly, so as encompass any type of program which characterizes network routes in terms of delay, loss or other types of performance data. For example, such a program need not explicitly identify each hop in a given route, but may instead just provide the minimal amount of information required to identify any network elements that are performing TOS remarking.

In step 102, the payloads of successive TTL exceeded messages are inspected to determine the associated TOS values. The TTL exceeded messages may be, for example, the above-noted ICMP TTL exceeded messages, although other types of time exceeded messages may be used in alternative embodiments. These TTL exceeded messages are received at the source from respective network elements on a given network path between the source and destination, responsive to the route tracing messages. The TTL exceeded messages each carry a payload that includes the IP header of the packet that is being dropped plus at least 8 bytes from the original payload of the packet that is being dropped. It is these payloads carried by the TTL exceeded messages that are inspected in step 102 to identify changes that may have been made to the designated TOS value. In principle, the only field of the IP header that should change as the packet is progressing towards its destination is the TTL field which should decrease by one with each successive router. If a router remarks the TOS field, however, the change will be apparent in the payload of the TTL exceeded messages from that point on.

Figure 2A:
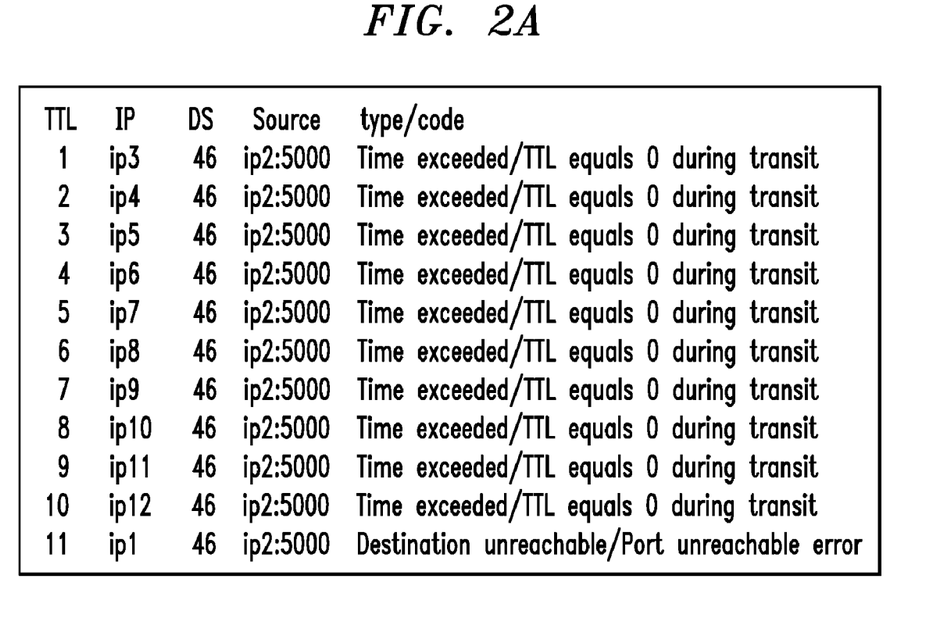
FIGS. 2A through 2D show examples of outputs that may be generated by the FIG. 1 process.

In step 104, a determination is made as to whether or not the designated TOS value referred to in step 100 has been preserved end-to-end over the given network path. As will be described in detail below, this determination does not look simply at the TOS value at source and destination, as in the problematic conventional approaches previously described, but is instead able to track the changes in TOS value over the entire path. Thus, if it is determined in step 104 that the designated TOS value has been preserved end-to-end, the process generates an output in step 106 indicating that there has been no modification of the TOS value in the network path. An example of an output that may be generated in step 106 is shown in FIG. 2A.

It should be noted in this regard that the path in some situations may include a network "cloud" associated with a given service provider, with some TOS remarking specific to the administrative domain of the service provider occurring within the cloud. For the present embodiment, it is assumed that such remarking is not problematic as long as the TOS value at the input and output of the cloud is the same. Step 104 would consider that type of remarking within a service provider cloud to preserve the TOS value end-to-end, although other embodiments need not make this assumption.

Figure 2B:
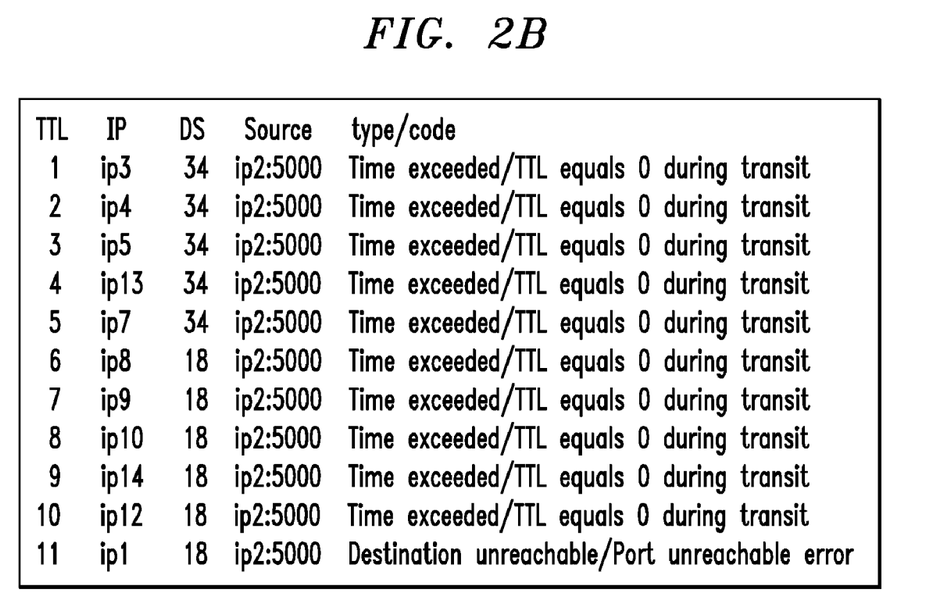

If it is determined in step 104 that the designated TOS value has not been preserved end-to-end, that is, TOS remarking has been observed in the inspection of the payloads of the successive TTL exceeded messages in step 102, the process moves to step 108 as shown. In step 108, the process generates output identifying the particular network element or network elements in the path that have made a modification in TOS value relative to the designated TOS value referred to in step 100. An example of an output that may be generated in step 108 is shown in FIG. 2B.

It was mentioned above that the process of FIG. 1 may be implemented in software. An exemplary set of pseudocode for one possible software implementation of the FIG. 1 process is as follows:

```
proc send:
    i=1
    while i<255:
        form packet pi by setting packet.ttl=i and packet.id=i
        send packet pi
        i=i+1
proc receive:
    i=1
    while i<255:
        receive ICMP packet
        store packet in storage location that corresponds
            to packet.id
        i=i+1
send
receive
i=1
while i<255:
    print IP header fields that correspond to the payload
of the ICMP packet at storage location i
    i=i+1
```

The send and receive functions in the above pseudocode can be performed concurrently so that the ICMP packets comprising the TTL exceeded messages begin to be collected before all of the route tracing packets are sent. The receive function may stop waiting for ICMP packets after a designated period of time, because for security reasons some routers are configured to not send ICMP packets at all. The loops in the pseudocode do not have to reach 255, although 255 is the largest possible TTL value. Indeed, it may be adequate to terminate the sending loop as soon as it becomes known that one packet has reached the destination. It will be known that the destination was reached when an ICMP destination or port unreachable error message is received from the destination IP address. Receipt of such a message is indicated in the final lines of the exemplary outputs shown in FIGS. 2A, 2B and 2C. It is apparent that this early termination of the sending loop requires that the receive loop be performed concurrently. Of course, if the sending loop is terminated early, the receiving loop can do the same.

It is possible that there may be multiple paths from source to destination. In order to account for such a possibility, the FIG. 1 process may be repeated multiple times. Many routers are flow preserving, meaning that they will make sure that streams of related packets are using the same path. Therefore, in order to increase the likelihood that the routers will use different paths for each repetition, certain parameters of the route tracing packets, such as source port number, destination port number, source IP address or destination IP address, in any combination, could be changed with each repetition.

Advantageously, the illustrative embodiment of FIG. 1 can identify the particular network element or elements that are performing TOS remarking by running a traceroute program on only a single network device. This overcomes the problems associated with the conventional approaches, previously described herein, which fail to identify the particular network elements that are performing TOS remarking.

It is to be appreciated that the particular arrangement of processing steps in FIG. 1 is presented by way of illustrative example only. Numerous alternative arrangements of processing steps may be used to detect the particular network elements that are performing TOS remarking using the techniques disclosed herein. For example, the payload inspection operation of step 102, the determination operation of step 104 and the output generation operations of steps 106 and 108 may be incorporated in whole or in part into a new route tracing program, such that the program automatically generates an indication of the particular network elements on a given path that are modifying TOS values. Such a route tracing program may be referred to herein as a traceTOS program or a TOS tracing software tool. Thus, it is to be appreciated that the FIG. 1 process can be implemented in the form of a TOS tracing software tool that is otherwise similar to the conventional traceroute utility.

The outputs referred to in steps 106 and 108 of the FIG. 1 process may be implemented in the form of a tabular display or other listing or presentation of the fields of the IP headers reported in successive TTL exceeded messages. This allows the network engineer to readily see how the TOS field is transformed from source to destination.

As indicated previously, FIG. 2A shows an example of an output generated in step 106, corresponding to a situation in which the designated TOS value has been preserved end-to-end. In this case, the designated DSCP value is 46, which as noted above is appropriate to the VoIP context. The DSCP values associated with the various TTL exceeded messages are shown in the column labeled DS. It can be seen that the values in this column remain constant at the designated value of 46. The other columns in the output in this example include columns for TTL value, IP address of the network element generating the TTL exceeded message, source IP address and port number, and message type/code.

Also as indicated previously, FIG. 2B shows an example of an output generated in step 108, corresponding to a situation in which the designated TOS value has not been preserved end-to-end. In this case, the designated DSCP value is 34, which as noted above is appropriate to VoIP signaling or video media. The DSCP values associated with the various TTL exceeded messages are again shown in the column labeled DS. It can be seen that the values in this column change at the network element denoted by the IP address ip8, which may denote a router associated with a particular service provider, from the designated value of 34 to a new value of 18. This type of remarking is generally undesirable, and as mentioned elsewhere herein can interfere with the normal operation of IP telephony and other network communications.

It should be noted that routers and other network elements that remark TOS values are typically configured to remark TOS values first and then to check the TTL. Thus, with reference to the FIG. 2B example, the network element denoted by IP address ip8 would be identified as the element that modified the TOS value. This indication may take any number of forms. For example, the corresponding line of the output, or just the IP address and DSCP value, may be bolded, shown in a different color, or otherwise highlighted. In other embodiments, certain network elements may be configured to check the TTL first and then remark the TOS value. Such an arrangement is atypical, but if a given network element is configured in this manner, the network element that made the modification will be the network element immediately prior to the given element on the path, that is, the element one hop away from the given element in the direction toward the source. Thus, embodiments of the invention may be configured to take into account the manner in which particular types of network elements perform TOS remarking in identifying the network element(s) that have actually modified a TOS value.

Figure 2C:
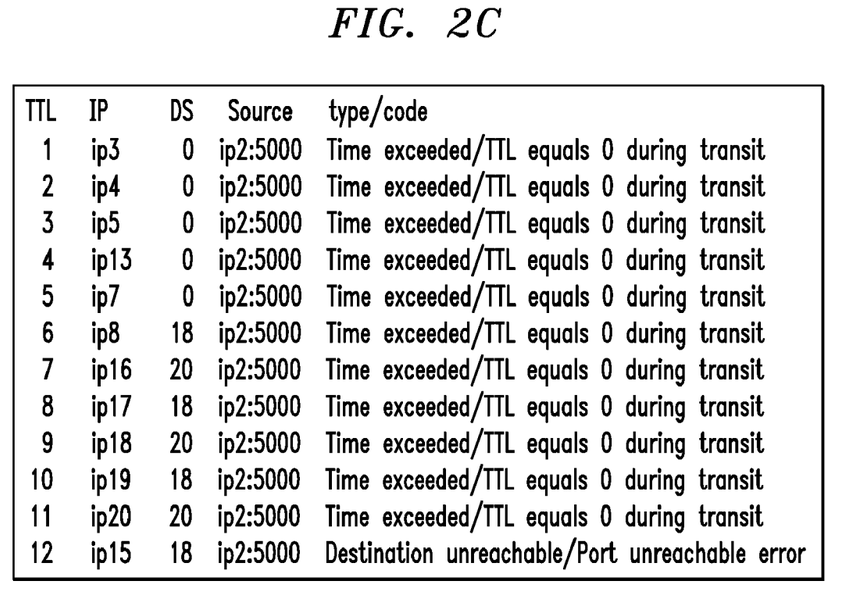

FIG. 2C shows an example of an output generated in step 108 for a situation in which there are multiple changes in the designated TOS value. Modification in the designated TOS value of 0 begins to occur at the router having IP address ip8. It can be seen that there is repeated remarking to values of 18 and 20. This may indicate that path selection is not flow preserving as different packets in the same flow are being treated differently. Again assuming the typical case where any remarking routers or other remarking network elements are configured to remark TOS first and then check the TTL, the network elements having IP addresses ip8 and ip15 through ip20 perform TOS remarking as indicated.

The exemplary outputs shown in FIGS. 2A, 2B and 2C are various types of visual displays that provide an indication of one or more remarking network elements in a visually-perceptible format. Numerous alternative types of outputs may be used in place of these tabular listings, such as outputs that simply identify the network elements, if any, that are responsible for detected instances of TOS remarking on a given network path.

The TOS remarking may be dependent upon the type of packets sent, and in such situations the FIG. 1 process may be repeated with different types of packets being sent to the destination for respective iterations of the process.

A given TOS tracing tool as described herein may be configured to report on other fields of the IP header that should remain constant. For example, the tool could be configured to report the value of the source IP address and source send port. The outputs shown in the examples of FIGS. 2A through 2C report such information in the column denoted Source. These two fields may be affected by network address translation (NAT) operations and such remarking could also interfere with IP telephony and other types of network communication.

A network engineer that sees anomalies in the outputs generated by the FIG. 1 process can reconfigure the particular routers or other network elements that are identified as performing undesirable remarking. Alternatively, the engineer may contact an administrator of the particular service provider domain in question, as appropriate.

A given illustrative embodiment of the invention may implement the FIG. 1 process in multiple network elements associated with IP telephony, such as call controllers, gateways, IP telephones, bridges, etc. Such an embodiment may execute the process periodically and automatically report any problems into a ticketing system or other network element via a known protocol such as Simple Network Management Protocol (SNMP). This type of arrangement can help to ensure a prompt resolution of any TOS remarking issues before such remarking begins to cause significant performance degradation in the network.

Figure 2D:
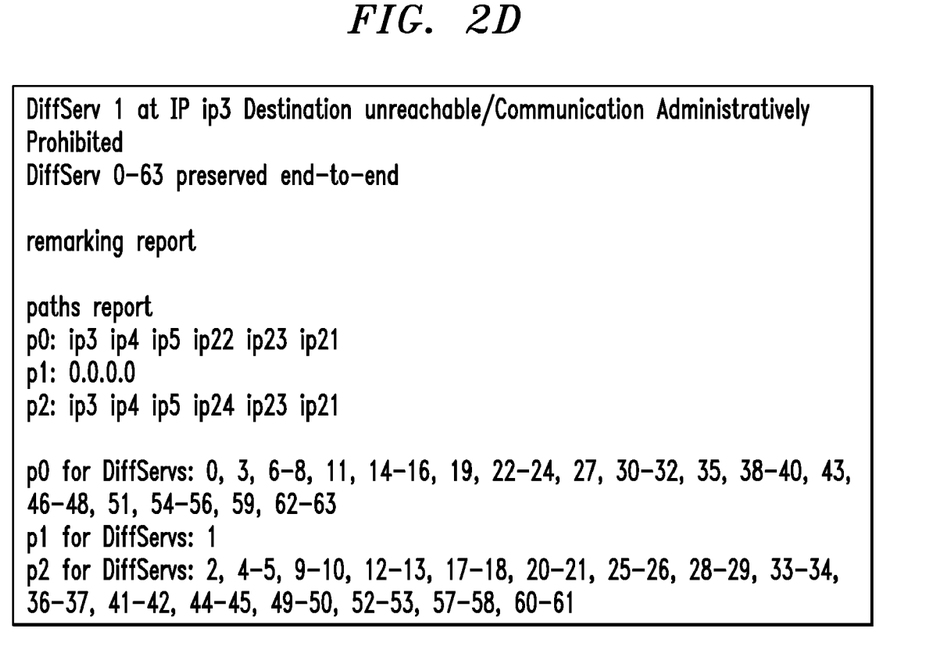

It may also be desirable to repeat the FIG. 1 process for each of a number of different designated TOS values, such as for all possible DSCP values between 0 and 63. Such an analysis can highlight any relationships that may exist between particular network paths and TOS remarking behavior. FIG. 2D shows an example of an output that may be generated in this type of embodiment. This output indicates that all packets having a DSCP value of 1 are dropped by the router having IP address ip3 but that all other DSCP values are preserved end-to-end. The output includes a remarking report that illustrates which DSCP values were transmitted over which of three paths denoted p0, p1 and p2. The remarking report reveals that there is load balancing between the routers having IP addresses ip22 and ip24 but that the allocation of paths p0 and p2 to particular DSCP values is not organized in a simple way. It is likely to be random and repetition could establish that. The load balancing does not appear to be affected by the DSCP values. The path p1 denotes an "empty" path, indicating that the packets with DSCP values of 1 do not get past the first router, which as noted above has IP address ip3.

In certain applications, it may be desirable to configure certain routers or other network elements to provide a particular TOS remarking. Thus, some TOS remarkings may be desirable rather than undesirable. For example, a router may be configured to mark all traffic coming in on a particular interface with DSCP value 46 because it is known or assumed that such traffic will be voice traffic. As another example, a given router may be configured to map Layer 2 markings, such as COS markings in accordance with the 802.1p protocol, into Layer 3 DSCP values. For such situations, the FIG. 1 process may be used by a network engineer to confirm that a particular desirable remarking is actually being performed in the network. For example, the route tracing packets can be sent with an arbitrary designated TOS value and the responses inspected to confirm the presence of the desired remarking. The disclosed techniques may therefore be implemented in tools to test the operation of Layer 3 classifiers or tools to test the operation of Layer 2 to Layer 3 translation mappings.

Figure 3:
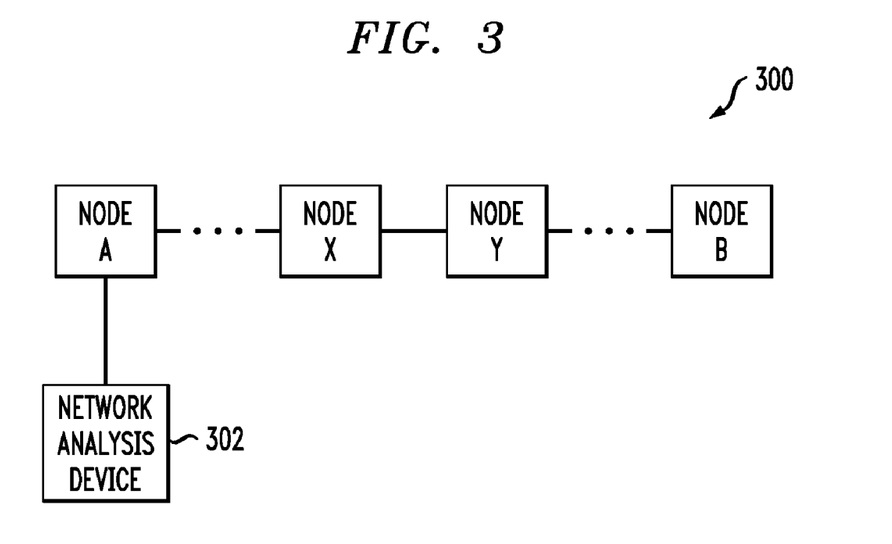
FIG. 3 shows a simple example of a network in which the process of FIG. 1 is implemented.

FIG. 3 shows a network 300 in which the above-described process for detecting TOS value modification is implemented. The network as shown is simplified for clarity of illustration, and the disclosed techniques may be applied to networks of much greater complexity. The network includes first and second network elements A and B, which correspond to the respective source and destination of the packets transmitted as part of the traceroute program. The network elements A and B are interconnected by links with additional network elements X and Y as shown. The network elements A, B, X and Y may comprise routers, switches, gateways or other processing elements of the network 300, in any combination. Generally, such a processing element may comprise a processor, a memory and a network interface, as will be described in greater detail below in conjunction with FIG. 4.

The network 300 may represent, for example, a global communication network such as the Internet, a wide area network, a metropolitan area network, a local area network, a wireless cellular network, a public switched telephone network (PSTN), or a satellite network, as well as portions or combinations of these or other communication networks. As indicated above, the network 300 may comprise conventional routers, switches, gateways or other processing elements.

Also included in the network 300 is a network analysis device 302 which is illustratively shown as being coupled to the first network element A. This device controls the performance of the process for detecting TOS value modification. For example, it may initiate performance of one or more instances of the traceroute program from network element A in step 100, inspect payloads of successive TTL exceeded messages in step 102, determine if the designated TOS value has been preserved end-to-end in step 104, and generate appropriate outputs in steps 106 and 108. Alternatively, it may perform only a subset of such operations, with the remaining operations being performed elsewhere in the network.

It should be noted that, although shown as a separate device in the exemplary network 300 of FIG. 3, the network analysis device 302 may alternatively be incorporated in whole or in part into the first network element A. Thus, a TOS remarking detection capability such as that associated with steps 100 through 108 in FIG. 1 may be incorporated into an otherwise conventional router, switch, gateway or other network element. Also, an associated traceroute program may run, for example, entirely on the first network element A, or partly on the network analysis device and partly on the network element A. Thus, the particular configuration shown in the figure is presented by way of illustrative example only. In other embodiments, the network 300 may include additional elements, comprising other types and arrangements of routing elements, switching elements or other types of processing elements.

The network analysis device 302 may comprise an otherwise conventional call controller of the network 300, or may be a part of such a call controller. For example, the device may illustratively comprise a VoIP call controller, such as a controller configured with Avaya Communication Manager IP telephony software, commercially available from Avaya Inc. of Basking Ridge, N.J., USA. A controller of this type is also commonly referred to as a "call manager." In non-VoIP embodiments of the invention, other types of centralized or distributed controllers may be used to implement the invention.

The techniques of the present invention can be used to facilitate identification of performance problems that are attributable to improper TOS remarking. Accordingly, such techniques may be implemented in or otherwise used in conjunction with known approaches to determining performance problem locations in a network, such as those disclosed in the above-cited U.S. Patent Application Publication No. 2005/0053009, as well as those used in numerous other known network monitoring and analysis systems.

A given embodiment of the invention may therefore be in the form of a method, apparatus or system for locating a performance problem in a network, with the location being determined based on detection of TOS remarking as described herein. Other embodiments of the present invention may involve, for example, altering the operation of a network based on the detection of TOS remarking, generating a report, alert or other indicator of TOS remarking and emailing or otherwise providing that indicator to a network administrator, or taking other real-time or non-real-time actions based on detection of TOS remarking or associated performance problem locations.

Figure 4:
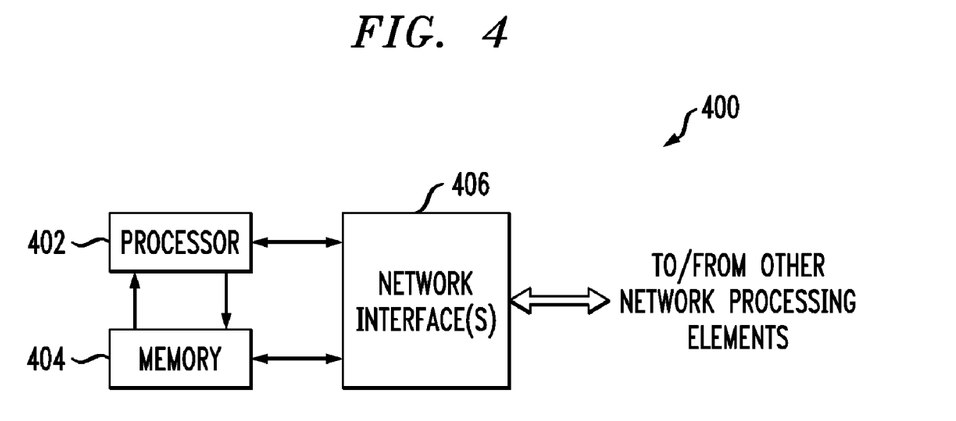
FIG. 4 is a block diagram showing one possible implementation of a given network analysis device, router or other processing element of the FIG. 3 network.

FIG. 4 shows an example of a given processing element 400 of the network 300. This processing element may be viewed as representing at least a portion of network analysis device 302, network element A, or a combination of these elements.

The processing element 400 as shown in the figure includes a processor 402 coupled to a memory 404 and one or more network interfaces 406. The techniques of the present invention may be implemented at least in part in the form of software storable in the memory 404 and executable by the processor 402. The memory 404 may represent random access memory (RAM), read-only memory (ROM), optical or magnetic disk-based storage, or other storage elements, as well as combinations thereof. The memory 404 is an example of what is more generally referred to herein as a processor-readable storage medium, and generally stores software code for implementing one or more steps of the FIG. 1 process.

Those skilled in the art will recognize that the individual elements of FIG. 4 as shown for illustrative purposes may be combined into or distributed across one or more processing devices, e.g., a microprocessor, an application-specific integrated circuit (ASIC), a computer or other device(s).

The FIG. 4 arrangement is considerably simplified for purposes of illustration. For example, if viewed as representative of a router, switch or other network element, the processing element 400 may include conventional elements typically associated with such a device, for example, elements associated with providing router functionality or switch functionality. Similarly, if viewed as representative of network analysis device 302, the processing element 400 may comprise input devices such as a mouse or keyboard, as well as output devices such as a display monitor, storage device or printer.

As previously noted, one or more of the operations associated with a TOS value modification detection process as described above in conjunction with the illustrative embodiments may be implemented in whole or in part in software utilizing processor 402 and memory 404 associated with a network processing element. Other suitable arrangements of hardware, firmware or software may be used to implement the techniques of the invention.

As mentioned above, the disclosed techniques are not limited to the context of IP telephony, but are more generally applicable to any type of data transmission, including video streaming and transmission of signaling information. Such data transmission is intended to encompass without limitation any type of transmission falling within the designator XoIP, where X denotes audio, video, signaling, etc.

It should again be emphasized that the above-described arrangements are illustrative only. For example, alternative embodiments may involve different types of trace routing programs and associated packets or other messages, different techniques for identifying particular network elements that have modified TOS values based on the messages, and alternative output presentations. Also, the particular processing steps associated with the TOS remarking detection in the illustrative embodiments may be varied. Furthermore, the particular assumptions used in the context of describing the illustrative embodiments should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method for a Voice-over-Internet-Protocol telephony communication manager to detect type-of-service remarking in a network, the method comprising:

transmitting, by a first element to a second element in the network, a plurality of route-tracing messages, wherein each route-tracing message comprises (i) a designated type-of-service value and (ii) a time-to-live value, and wherein the time-to-live value monotonically increases with each successive route-tracing message;

receiving, by the first element, a plurality of time-exceeded messages, wherein each time-exceeded message comprises a type-of-service value that is associated with an element in the network that received at least one of the route-tracing messages;

calculating, by the first element, a path from the first element to the second element, wherein the path comprises the elements in the network from which the first element received at least one time-exceeded message; and identifying, by the first element, a third element that is in the path between the first element and the second element and is associated with a type-of-service value that is different than the designated type-of-service value;

wherein the network comprises the first element, the second element, and the third element, and wherein the first element is the Voice-over-Internet-Protocol telephony communication manager that operates in the network, and wherein the Voice-over-Internet-Protocol telephony communication manager periodically and automatically repeats the transmitting, receiving, calculating, and identifying operations for each of a plurality of different paths in the network, enabling the Voice-over-Internet-Protocol telephony communication manager to detect type-of-service remarking by elements in the network.

2. The method of claim 1 wherein the transmitting a plurality of route-tracing messages comprises running a route tracing program that uses the designated type-of-service value.

3. The method of claim 2 wherein the route tracing program comprises a traceroute utility.

4. The method of claim 1 wherein the designated type-of-service value comprises a designated Differentiated Services Code Point (DSCP) value.

5. The method of claim 1 wherein the designated type-of-service value comprises a designated class of service value.

6. The method of claim 1 wherein the transmitting, receiving, calculating, and identifying are repeated for each of a plurality of different designated type-of-service values.

7. The method of claim 6 wherein the different designated type-of-service values for which the transmitting, receiving, calculating, and identifying are repeated comprise a sequence of Differentiated Services Code Point values between a designated lower bound and a designated upper bound.

8. The method of claim 1 wherein the first element comprises a network analysis device that implements the transmitting, receiving, calculating, and identifying operations at least in part.

9. The method of claim 1 further comprising:
reconfiguring the third element to one of: prevent it from remarking the type-of-service value, and permit it to remark the type-of-service value to only a value within a set of designated values.

10. The method of claim 1 further comprising:
transmitting an indicator of the identified third element to at least one of a ticketing system, a visual display, and a network administrator.

11. The method of claim 1 further comprising:
altering operation of the network based on the identified third element.

12. A Voice-over-Internet-Protocol telephony communication manager comprising:
a processing element comprising a processor and a memory, the memory being non-transitory and also being coupled to the processor; and
an interface to a network,
wherein the processing element, under control of the processor, is operative to:
transmit, to a first element in the network, a plurality of route-tracing messages, wherein each route-tracing message comprises (i) a designated type-of-service value and (ii) a time-to-live value that monotonically increases with each successive route-tracing message;
receive a plurality of time-exceeded messages, wherein each time-exceeded message comprises a type-of-service value that is associated with an element in the network that received at least one of the route-tracing messages;
calculate a path from the processing element to the first element, wherein the path comprises the elements in the network from which the processing element received at least one time-exceeded message; and
identify a second element that is in the path between the processing element and the first element and is associated with a type-of-service value that is different than the designated type-of-service value;
wherein the network comprises the processing element, the first element, and the second element, and
wherein the Voice-over-Internet-Protocol telephony communication manager automatically and periodically executes the transmit, receive, calculate, and identify operations for each of a plurality of network paths to detect type-of-service remarking by elements in the network.

13. The apparatus of claim 12 wherein:
the third element reports any anomalies.

14. The Voice-over-Internet-Protocol telephony communication manager of claim 12 wherein the designated type-of-service value comprises at least one of: a designated Differentiated Services Code Point (DSCP) value, and a designated class of service value.

15. The Voice-over-Internet-Protocol telephony communication manager of claim 12 wherein the transmitting, receiving, calculating, and identifying are repeated for each of a plurality of different designated type-of-service values.

16. The Voice-over-Internet-Protocol telephony communication manager of claim 15 wherein the different designated type-of-service values for which the transmitting, receiving, calculating, and identifying are repeated comprise a sequence of Differentiated Services Code Point values between a designated lower bound and a designated upper bound.

17. The Voice-over-Internet-Protocol telephony communication manager of claim 12 wherein the processing element is further operative to:
reconfigure the identified second element to one of: prevent it from remarking the type-of-service value, and permit it to remark the type-of-service value to only a value within a set of designated values.

18. The Voice-over-Internet-Protocol telephony communication manager of claim 12 wherein the processing element is further operative to:
transmit an indicator of the identified second element to at least one of a ticketing system, a visual display, and a network administrator.

19. The Voice-over-Internet-Protocol telephony communication manager of claim 18 wherein the indicator is transmitted via the Simple Network Management Protocol.

20. The Voice-over-Internet-Protocol telephony communication manager of claim 12 wherein the processing element is further operative to:
alter the operation of the network based on the identified second element.

* * * * *